United States Patent [19]
Bartha

[11] Patent Number: 5,804,780
[45] Date of Patent: Sep. 8, 1998

[54] VIRTUAL TOUCH SCREEN SWITCH

[75] Inventor: Istvan Bartha, Cary, N.C.

[73] Assignee: Ericsson Inc., Research Triangle Park, N.C.

[21] Appl. No.: 777,626

[22] Filed: Dec. 31, 1996

[51] Int. Cl.⁶ .................................................. H01H 13/70
[52] U.S. Cl. ........................................... 200/5 A; 379/428
[58] Field of Search ................................... 200/5 R, 5 A, 200/6 R, 6 C, 553, 557, 341, 342, 343; 379/428, 429, 433, 434, 440; 345/173, 905

[56] References Cited

U.S. PATENT DOCUMENTS

| | | | |
|---|---|---|---|
| 4,476,356 | 10/1984 | Nakayama et al. | 200/6 A |
| 4,786,767 | 11/1988 | Kuhlman | 200/5 A |
| 5,149,924 | 9/1992 | Priesemuth | 200/5 R |
| 5,422,656 | 6/1995 | Allard et al. | 345/173 |

*Primary Examiner*—Khanh Dang
*Attorney, Agent, or Firm*—Nixon & Vanderhye PC

[57] ABSTRACT

A virtual touch screen switch includes a push window disposed over a display assembly. The transparent push window functions similar to a toggle switch, while enabling touch screen functionality. In a preferred arrangement, the push window is disposed in a display opening of an electronic apparatus and is pivotable between a neutral position and one or more actuating positions where an actuator mounted to the push window actuates a PCB switch. With this arrangement, function keys from the electronic apparatus can be eliminated with a toggle-type switch arrangement, thereby reducing the apparatus size while maintaining reasonable manufacturing costs.

21 Claims, 3 Drawing Sheets

VIRTUAL TOUCH SCREEN SWITCH

BACKGROUND OF THE INVENTION

The present invention relates to a switch assembly for an electronic device and, more particularly, to a virtual touch screen switch for an electronic apparatus such as a cellular phone.

In an electronic device such as a cellular phone, various device functions are manipulated by the use of function, scrolling and selecting keys. These keys, however, take up a significant amount of space relative to desired size constraints. In order to reduce the size of cellular phones, it has been proposed to eliminate the function manipulation keys in favor of a touch screen. Touch screens, however, require complex circuitry, thereby increasing manufacturing costs of the device.

SUMMARY OF THE INVENTION

It is therefore an object of the invention to provide a virtual touch screen switch that overcomes the drawbacks associated with the prior art. It is another object of the invention to provide a virtual touch screen switch utilizing a conventional LED or LCD screen and a plastic window that functions similar to a toggle switch. It is still another object of the invention to provide a cellular phone incorporating a virtual touch screen switch having touch screen functionality, while minimizing phone size and maintaining low manufacturing costs.

In accordance with the invention, an LED or LCD window has two functions including protecting the display assembly and providing an active interface between the user and the electronic apparatus. The virtual touch screen switch can be used as a display in any electronic apparatus where a dialog is required between the user and the apparatus. Physically, the virtual touch screen switch consists of a conventional LED or LCD screen and a plastic window that also works similar to a toggle switch both electrically and mechanically.

In a cellular phone, the virtual touch screen switch can be used to replace one, two or four of the keys. The switch would replace the "function specific" keys in the cellular phone, as the cellular phone could ask questions directly on the display screen and at the same time present different alternatives on the display screen. The user then merely pushes down the window adjacent the selected alternative. In this regard, the virtual touch screen switch improves the interface between the user and the phone, as alternative choices can be expressed more clearly than with, for example, regular YES/NO buttons. That is, by utilizing the virtual touch screen switch according to the invention, the apparatus can express alternatives such as HIGH/LOW, HOUR/MIN, FWD/BKWD, ON/OFF, etc. in addition to YES/NO. As a result, the different apparatus functions are easier for the user to understand and program. Moreover, because the virtual touch screen switch includes a wear resistant window to protect the display screen, the product will be more robust than if using a conventional touch screen.

In accordance with an exemplary embodiment of the invention, there is provided a virtual touch screen switch including a display assembly and a push window disposed over the display assembly. In preferred embodiments, the display assembly is one of an LCD and an LED. The push window is substantially transparent and pivotable relative to the display assembly and includes at least one actuator that actuates a printed circuit board (PCB) switch in accordance with a position of the push window. Alternatively, the switches may be built in the light guide beneath the LCD, and then via the light guide are electrically connected to the board. In still another alternative, the switches are disposed in the push window and are electrically connected to the circuitry. A spring member may be disposed engaging the push window that urges the push window toward a neutral position. In this regard, the spring member is disposed between the push window and the display assembly and preferably includes a rubber gasket disposed surrounding the display assembly. A light guide may be disposed adjacent the display assembly on the side of the display assembly opposite from the push window. The light guide includes a hinge connector cooperating with a hinge pin on the push window. In this regard, the light guide preferably includes a pair of hinge connectors disposed substantially along a central longitudinal axis of the switch, and the push window includes a pair of push pins correspondingly disposed along the central longitudinal axis such that the push window is pivotable about the central longitudinal axis between a left position, a neutral position and a right position. The push window in this arrangement includes a pair of actuators that actuate corresponding PCB switches in the left position and the right position, respectively.

The push window in another arrangement may be pivotable about a longitudinal axis between an actuate position and a neutral position, wherein the push window includes one actuator that actuates the PCB switch in the actuate position. Alternatively, the push window may be pivotable about a central longitudinal axis of the switch between a left position, a neutral position and a right position, and the push window includes a pair of actuators that actuate corresponding PCB switches in the left position and the right position, respectively. In still another alternative arrangement, the push window may be pivotable about a central longitudinal axis of the switch between a left position, a neutral position and a right position and about a central lateral axis between a forward position, a neutral position and a rearward position. The push window in this arrangement includes four actuators that actuate corresponding PCB switches in the left position, the right position, the forward position and the rearward position, respectively. In yet another alternative arrangement, the push window is pivotable about a centrally disposed pivot between a left forward position, a left rearward position, a right forward position, a right rearward position and a neutral position. The push window in this arrangement includes four actuators that actuate corresponding PCB switches in the left forward position, the left rearward position, the right forward position, and the right rearward position, respectively.

In accordance with another aspect of the invention, there is provided a cellular phone including a phone casing housing phone components and having a display opening therein, a printed circuit board (PCB) operatively coupling the phone components, a display assembly disposed adjacent the display opening, and a push window disposed over the display assembly in the display opening. The push window is substantially transparent and is pivotable relative to the display assembly. The push window preferably includes at least one actuator that actuates a switch on the PCB in accordance with a position of the push window.

BRIEF DESCRIPTION OF THE DRAWINGS

These and other aspects and advantages of the invention will be described in detail with reference to the accompanying drawings, in which.

DETAILED DESCRIPTION OF PREFERRED EMBODIMENTS

The virtual touch screen switch according to the present invention is described in conjunction with the application to a cellular phone. This application, however, is merely exemplary as the concepts of the invention are applicable to any electronic apparatus utilizing a display screen and requiring an interface between the user and the apparatus. The invention is thus not meant to be limited to the cellular phone application.

Figure 1:
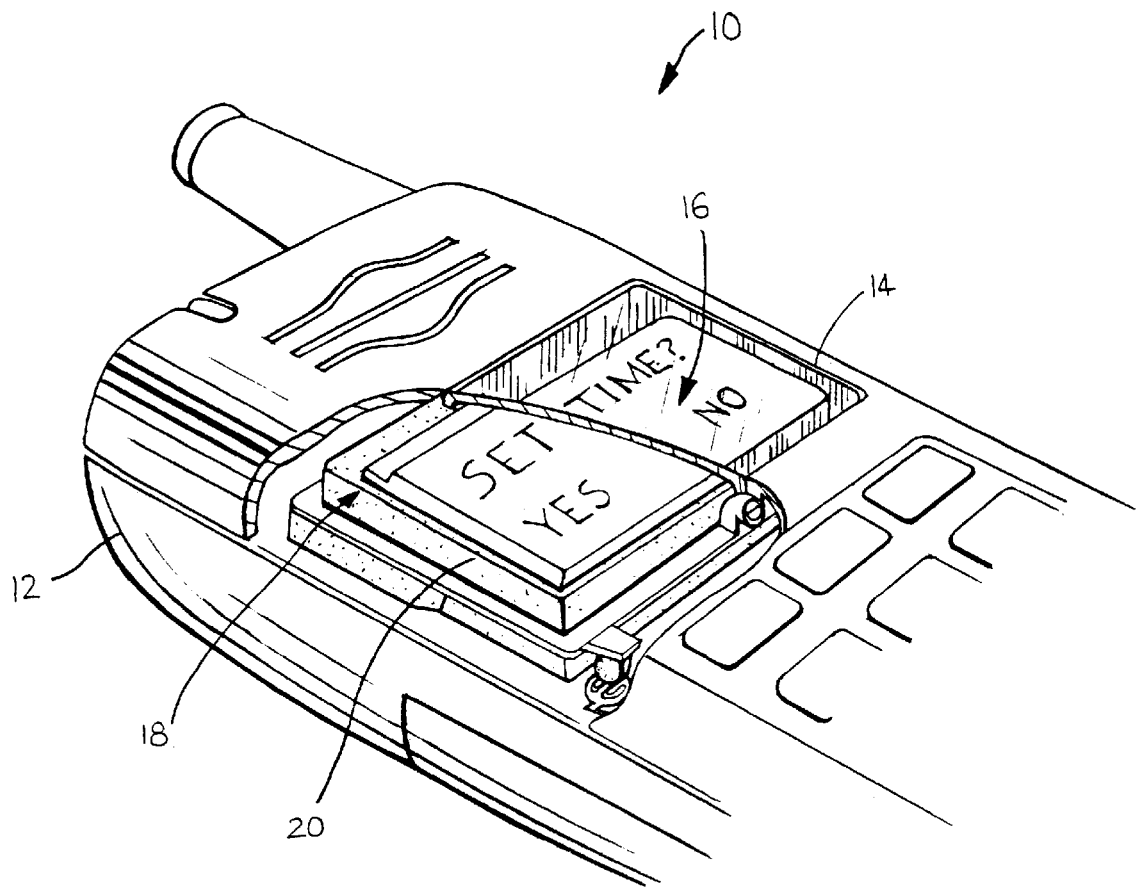
FIG. 1 is a partial perspective view of a cellular phone incorporating the virtual touch screen switch according to the present invention.

Referring to FIG. 1, a cellular phone 10 includes a phone casing 12 that houses the electrical and mechanical components of the phone including a printed circuit board (PCB). The phone casing 12 includes a display opening 14 and houses a display assembly 16, which is disposed adjacent the display opening 14. The display assembly 16 includes any suitable display apparatus such as a conventional LCD or LED. The structure effecting operation of the display apparatus is well known, and the details thereof will thus not be further described.

Figure 2:
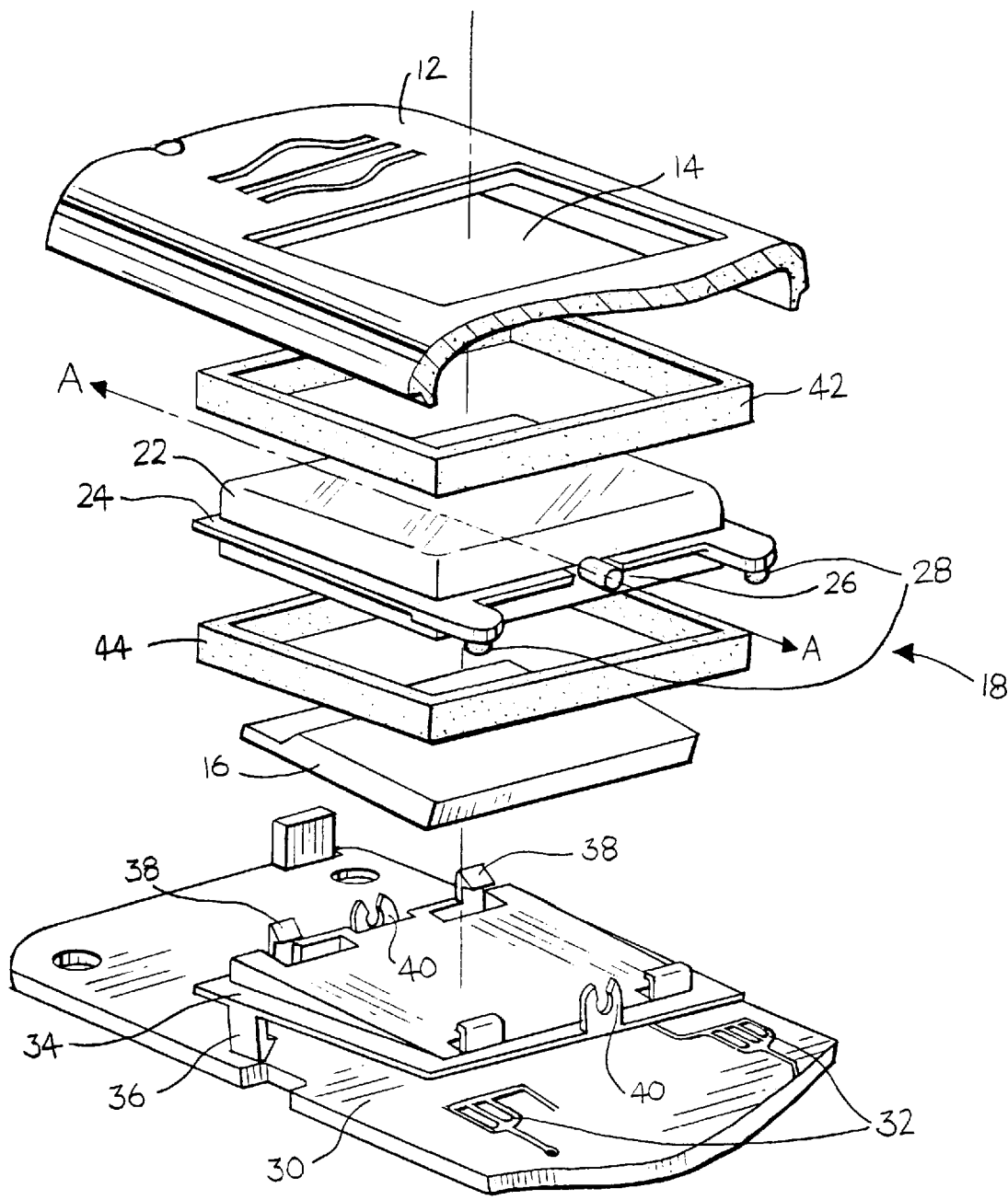
FIG. 2 is an exploded view of a two-key virtual touch screen switch.

Disposed between the display opening 14 and the display assembly 16 is a virtual touch screen switch 18, which enables touch screen operation utilizing a plastic window that functions similar to a toggle switch both electrically and mechanically. FIG. 2 is an exploded view illustrating an exemplary embodiment according to the invention. The virtual touch screen switch 18 includes a push window 22 that is formed of a transparent plastic material. Other possible transparent materials that are suitable include, for example, tempered glass, sapphire glass and the like. The push window 22 is supported by a pivot frame 24 that surrounds the push window 22. A pair of hinge pins 26 are secured to the push window disposed substantially along a central longitudinal axis A—A of the switch. The pivot frame 24 and hinge pins 26 are secured to the push window in any suitable manner such as with glue, tape or by being molded therewith. A pair of actuators 28 are secured to the pivot frame 24 for actuating corresponding switches on the PCB 30. As shown in FIG. 2, the PCB switches 32 consist of a conductive pattern on the PCB that completes a circuit when connected by the conductive rubber material of the actuators 28. Of course, the conductive pattern switches are exemplary, and other suitable switches could be used, such as dome type switches, surface mounted switches or other contact switches.

A light guide 34 for illuminating the display assembly 16 is secured to the PCB 30 with, for example, a pair of light guide brackets 36. The light guide 34 is formed of a transparent/semi-transparent plastic material and distributes light to the display assembly. The brackets 36 are preferably formed integral with the light guide 34 and include detents 37 that serve to latch onto the PCB 30. Display apparatus brackets 38 secure the display panel of the display assembly 16 to the light guide 34. The display apparatus brackets 38 include detents 39a that latch onto the display panel in cooperation with support brackets 39b. Of course, the configuration could include any suitable securing means for brackets 36 and brackets 38, and the invention is not meant to be limited to the structure that is illustrated and described. Hinge snaps 40, which are preferably formed integral with the light guide 34, are shaped to receive the hinge pins 28 of the push window 22 such that the hinge pins 28 are rotatable in the hinge snaps 40.

The push window 22 is sandwiched by an upper foam rubber spring/gasket 42 and a lower foam rubber spring/gasket 44 that are disposed surrounding the push window 22 against the pivot frame 24. The upper spring/gasket 42 is disposed between the casing 12 and the push window 22, and the lower spring/gasket 44 is disposed between the push window 22 and the light guide 34. In operation, the upper spring/gasket 42 and the lower spring/gasket 44 serve as a spring unit, urging the push window toward a neutral position. The structure could include other spring configurations that are suitable for the application, and the invention is not meant to be limited to the disclosed spring/gaskets.

In the assembled condition, the push window 22 is accessible through the window opening 14 of the phone casing 12. Because the push window 22 is transparent, the display assembly 16 is readily viewable through the push window 22. The push window 22 thus also serves to protect the display assembly from dirt and the like. In the neutral position, neither of the actuators 28 is engaged with the conductive pattern switches 32 on the PCB. The hinge pins 26 secured to the push window are snap fit into the hinge snaps 40 such that the push window 22 is pivotable about the central longitudinal axis A—A.

Figure 3:
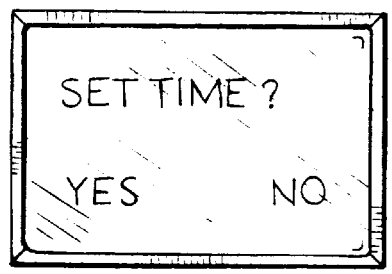
FIG. 3 is an example screen of the virtual touch screen switch.

FIG. 3 illustrates an exemplary display requesting whether the user would like to set the time for the electronic apparatus. In this instance, if the user chooses to set the time, the user presses the push window 22 in the vicinity of the word "YES" on the display. The user's force thus causes the push window 22 to pivot via the hinge pins 26 about the central longitudinal axis A—A to a left position. In this position, the left actuator 28 contacts the corresponding conductive pattern switch 32 on the PCB 30 to thereby actuate the switch. When the user releases the push window 22, one or both of the foam rubber spring/gaskets 42, 44 returns the push window 22 to its neutral position. In similar regard, if the user desires to select "NO," the user will press the push window 22 in the vicinity of the word "NO" on the display, and the push window 22 is pivoted to a right position, actuating the corresponding conductive pattern switch 32 on the PCB 30.

Figure 4:
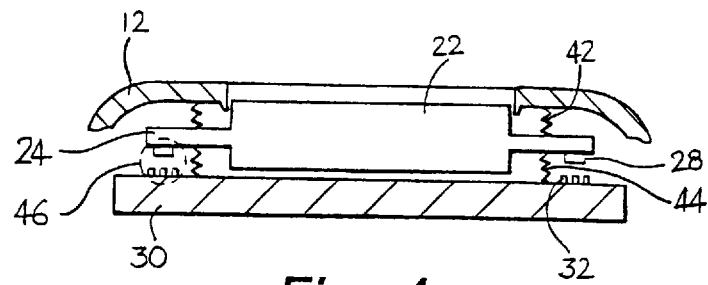
FIG. 4 is a cross-sectional view of the switch configuration replacing two keys.

In other embodiments, the virtual touch screen switch according to the present invention can be utilized to replace a single key or up to four keys as opposed to the two-key arrangement described above. FIG. 4 illustrates an embodiment where the virtual touch screen switch according to the invention replaces one key on the electronic apparatus. In this embodiment, the push window 22, similar to the first embodiment, is maintained in a neutral position by one or more foam rubber spring/gaskets 42, 44. The pivot frame 24 and light guide 34 include a connector assembly 46 at one end thereof (left end in FIG. 4). At the opposite end, the pivot frame 24 includes an actuator 28 that is engageable with a corresponding switch 32 on the PCB 30. When a user imparts a force F on the push window 22, the actuator 28 engages the PCB switch 32. When the force is released, the spring/gaskets return the push window 22 to its neutral position.

Figure 5:
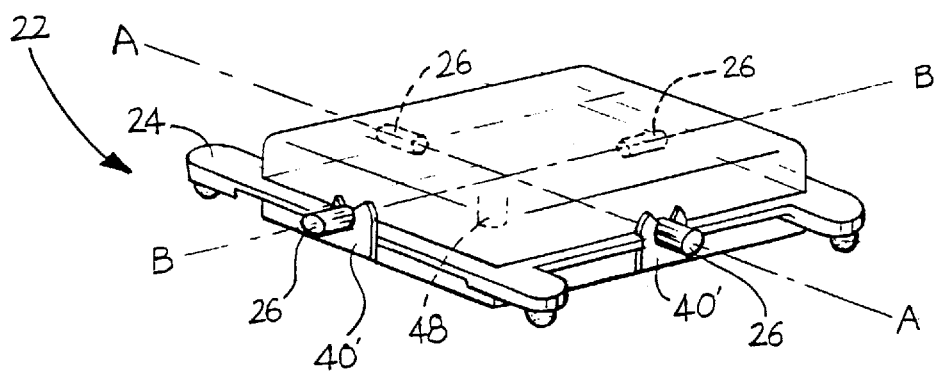
FIG. 5 is a perspective view of the switch replacing four keys.

FIG. 5 illustrates the switch arrangement replacing four keys on the electronic apparatus. In this embodiment, the push window 22 is provided with four hinge pins 26 engaging corresponding hinge snaps on the light guide. Two of the hinge pins 26 are disposed substantially along the central longitudinal axis A—A of the switch, and the other two of the hinge pins 26 are disposed substantially along a central lateral axis B—B of the switch. The hinge snaps 40' are elongated to enable pivoting about each axis. The push window is thus pivotable between a left position, a neutral position and a right position about the central longitudinal axis A—A and between a forward position, a neutral position, and a rearward position about the central lateral axis B—B. Corresponding actuators secured to the pivot frame 24 engage switches on the PCB.

As an alternative to the multiple hinge pin and hinge snap structure, a single centrally disposed pivot 48 (shown in phantom in FIG. 5) may be utilized enabling the push window 22 to pivot between left and right forward and rearward positions, respectively.

By virtue of the virtual touch screen switch according to the present invention, touch screen functionality can be achieved with relatively inexpensive toggle-type switch structure. This arrangement enables the elimination of up to four keys on an electronic apparatus, thereby significantly reducing the size of the apparatus while maintaining functionality and minimizing manufacturing costs.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A virtual touch screen switch comprising:
    a display assembly comprising a display apparatus;
    a push window disposed over said display assembly, said push window being substantially transparent, wherein said push window is pivotable relative to said display assembly; and
    at least one actuator coupled with said push window.

2. A virtual touch screen switch according to claim 1, further comprising a spring member disposed engaging said push window, said spring member urging said push window toward a neutral position.

3. A virtual touch screen switch according to claim 2, wherein said spring member is disposed between said push window and said display assembly.

4. A virtual touch screen switch according to claim 2, wherein said spring member comprises a rubber gasket disposed surrounding said display assembly.

5. A virtual touch screen switch according to claim 1, further comprising a light guide disposed adjacent said display assembly on a side of said display assembly opposite from said push window, said light guide comprising a hinge connector, wherein said push window comprises a hinge pin cooperating with said hinge connector.

6. A virtual touch screen switch according to claim 5, wherein said light guide comprises a pair of hinge connectors disposed substantially along a central longitudinal axis of the switch, the virtual touch screen switch further comprising:
    a pair of hinge pins attached to said push window and correspondingly disposed along said central longitudinal axis such that said push window is pivotable about said central longitudinal axis between a left position, a neutral position and a right position; and
    a pair of actuators coupled with said push window.

7. A virtual touch screen switch according to claim 1, wherein said push window is pivotable about a longitudinal axis between an actuate position and a neutral position, the virtual touch screen switch comprising one actuator coupled with said push window.

8. A virtual touch screen switch according to claim 1, wherein said push window is pivotable about a central longitudinal axis of the switch between a left position, a neutral position and a right position, the virtual touch screen switch comprising a pair of actuators coupled with said push window.

9. A virtual touch screen switch according to claim 1, wherein said push window is pivotable about a central longitudinal axis of the switch between a left position, a neutral position and a right position and about a central lateral axis between a forward position, a neutral position and a rearward position, the virtual touch screen switch comprising four actuators coupled with said push window.

10. A virtual touch screen switch according to claim 1, wherein said push window is pivotable about a centrally disposed pivot between a left forward position, a left rearward position, a right forward position, a right rearward position, and a neutral position, the virtual touch screen switch comprising four actuators coupled with said push window.

11. A virtual touch screen switch according to claim 1, wherein said display apparatus is one of an LCD and an LED.

12. A cellular phone comprising:
    a phone casing housing phone components, said phone casing having a display opening therein;
    a printed circuit board (PCB) operatively coupling the phone components;
    a display assembly disposed adjacent said display opening;
    a push window disposed over said display assembly in said display opening, said push window being substantially transparent, wherein said push window is pivotable relative to said display assembly; and
    at least one actuator coupled with said push window that actuates a switch on said PCB in accordance with a position of said push window.

13. A cellular phone according to claim 12, further comprising a first spring member disposed engaging said push window, said first spring member urging said push window toward a neutral position.

14. A cellular phone according to claim 13, wherein said first spring member is disposed between said push window and said display assembly.

15. A cellular phone according to claim 13, further comprising a second spring member disposed between said push window and said phone casing.

16. A cellular phone according to claim 12, further comprising a light guide disposed adjacent said display assembly on a side of said display assembly opposite from said push window, said light guide comprising a hinge connector, wherein said push window comprises a hinge pin cooperating with said hinge connector.

17. A cellular phone according to claim 16, wherein said light guide comprises a pair of hinge connectors disposed substantially along a central longitudinal axis of the switch, the cellular phone further comprising:
    a pair of hinge pins attached to said push window and correspondingly disposed along said central longitudinal axis such that said push window is pivotable about said central longitudinal axis between a left position, a neutral position and a right position; and a pair of actuators coupled with said push window, said actuators actuating corresponding switches on said PCB in said left position and said right position, respectively.

18. A cellular phone according to claim 12, wherein said push window is pivotable about a longitudinal axis between an actuate position and a neutral position, the cellular phone comprising one actuator coupled with said push window that actuates the switch on said PCB in said actuate position.

19. A cellular phone according to claim 12, wherein said push window is pivotable about a central longitudinal axis between a left position, a neutral position and a right position, the cellular phone comprising a pair of actuators coupled with said push window that actuate corresponding switches on said PCB in said left position and said right position, respectively.

20. A cellular phone according to claim 12, wherein said push window is pivotable about a central longitudinal axis of the switch between a left position, a neutral position and a right position and about a central lateral axis between a forward position, a neutral position and a rearward position, the cellular phone comprising four actuators coupled with said push window that actuate corresponding switches on said PCB in said left position, said right position, said forward position and said rearward position, respectively.

21. A cellular phone according to claim 12, wherein said push window is pivotable about a centrally disposed pivot between a left forward position, a left rearward position, a right forward position, a right rearward position, and a neutral position, the cellular phone comprising four actuators coupled with said push window that actuate corresponding switches on said PCB in said left forward position, said left rearward position, said right forward position, and said right rearward position, respectively.

* * * * *